US 7,953,396 B2

(12) United States Patent
Bäckström et al.

(10) Patent No.: US 7,953,396 B2
(45) Date of Patent: May 31, 2011

(54) REDUCING LATENCY IN PUSH TO TALK SERVICES

(75) Inventors: Martin Bäckström, Danderyd (SE);
Anders Larsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 968 days.

(21) Appl. No.: 10/591,689

(22) PCT Filed: Mar. 4, 2004

(86) PCT No.: PCT/EP2004/050253
§ 371 (c)(1),
(2), (4) Date: Jun. 6, 2007

(87) PCT Pub. No.: WO2005/096646
PCT Pub. Date: Oct. 13, 2005

(65) Prior Publication Data
US 2007/0281672 A1   Dec. 6, 2007

(51) Int. Cl.
*H04Q 7/38* (2006.01)
(52) U.S. Cl. .................................... 455/414.3; 455/519
(58) Field of Classification Search .................. 455/519, 455/563; 709/232; 370/285
See application file for complete search history.

(56) References Cited

U.S. PATENT DOCUMENTS

| 5,157,728 | A | 10/1992 | Reed et al. | |
|---|---|---|---|---|
| 2002/0173325 | A1 | 11/2002 | Maggenti et al. | |
| 2003/0115045 | A1* | 6/2003 | Harris et al. | 704/214 |
| 2003/0223381 | A1* | 12/2003 | Schroderus | 370/285 |
| 2004/0121812 | A1* | 6/2004 | Doran et al. | 455/563 |
| 2005/0044256 | A1* | 2/2005 | Saidi et al. | 709/232 |

FOREIGN PATENT DOCUMENTS

EP    0 584 904 A    3/1994

OTHER PUBLICATIONS

International Search Report of PCT/EP2004/050253, mailed Nov. 10, 2004.
"3rd Generation Partnership Project; Technical Specification Group Core Network; IP Multimedia Call Control Protocol based on SIP and SDP; Stage 3 (Release 5)", 3GPP TS 24.229 V5.4.0, Mar. 2003, pp. 1-70, XP002294975.

* cited by examiner

*Primary Examiner* — Phuoc Doan
(74) *Attorney, Agent, or Firm* — Nixon & Vanderhye P.C.

(57) ABSTRACT

A method of processing user speech data for transmission to a participant or participants in a Push to talk Over Cellular (PoC) session over a cellular telephone network. The method comprises, detecting an initial period of silence in the initial talk burst of the session, and removing that period of silence from the speech data prior to replaying of the speech data to the or each other participant. These signal processing steps may be carried out at one of the initiating terminal, the receiving terminal, or the IMS core.

18 Claims, 3 Drawing Sheets

REDUCING LATENCY IN PUSH TO TALK SERVICES

This application is the US national phase of international application PCT/EP2004/050253, filed 4 Mar. 2004, which designated the U.S., the entire content of which is hereby incorporated by reference.

TECHNICAL FIELD

The technology relates to reducing the latency in Push to Talk services and in particular in so-called Push to Talk Over Cellular services.

BACKGROUND

Push to Talk is the generic name for a range of services which enable users of mobile wireless handsets to communicate with one another almost instantaneously and at the push of a button, or at least at the push of a small number of buttons. An industry grouping is in the process of standardizing a Push to Talk service for introduction into present and future cellular networks including GSM with packet data services and 3G. The service is known as "Push to talk Over Cellular" (PoC).

PoC makes use of the IP Multimedia Subsystem (IMS) standardized by the $3^{rd}$ Generation Partnership Project to facilitate the introduction of advanced data services into cellular networks, and in particular of real-time multimedia services. The IMS relies upon the Session Initiation Protocol (SIP) which has been defined by the Internet Engineering Task Force (IETF) for the setting up and control of multimedia IP-based sessions. FIG. 1 illustrates schematically the architecture of a cellular network which provides for PoC services between a number of user terminals or User Equipments (UEs) 1 in 3G parlance. UEs are attached to respective Radio Access Networks 2 which in turn are coupled to the IMS core 3. Within the IMS core 3, a number of servers are present including Serving Call Session Control Function (S-CSCF) servers 4 which are the main SIP servers that maintain session state for IMS services, and Proxy Call Session Control Function (P-CSCF) servers 5 which are the first points of contact for the UEs and which forward SIP messages to the S-CSCFs. The servers of the IMS core 3 are distributed within an operator's network and between networks. Additionally, a PoC server 6 is located within the IMS or is attached thereto. The PoC server may incorporate a Media Resource Function (MRF) node as defined by 3GPP.

FIG. 2 illustrates certain signaling associated with setting up a PoC session across the network of FIG. 1 (additional messages may also be transferred between the various nodes, although these are not shown in the Figure). A subscriber initiates a session by pressing the appropriate button on his/her terminal UE#1. This causes a SIP INVITE message to be sent to the peer terminal UE#2 via the PoC server in the IMS core, followed by the transfer of further signaling between the terminals and the IMS. As already mentioned, a key component of PoC is the near instantaneous connection of parties. Significant delays in transmitting speech are therefore to be avoided.

The time between the SIP INVITE message being sent and the IMS receiving an acceptance from the called party can be as much as 3 seconds due to fundamental properties of the network (e.g. paging, Temporary Block Flow (TBF) establishment, etc). In order to speed up the initial connection process, the initiating subscriber is therefore able to start talking upon receipt by his terminal of the SIP 202 Accepted message from the IMS (usually signaled to the initiating subscriber by the playing of a tone or "beep" on his terminal), even though the called party has not yet accepted the session. The initial talk burst may be buffered by a PoC server within the network until such time as it receives the SIP 200 OK message from the peer terminal. When that message is received, the talk burst is immediately sent to the peer terminal. Nonetheless, the delay perceived by the called party remains significant and it is desirable to reduce the delay still further.

SUMMARY

The inventor has recognised that the initiating subscriber is unlikely to begin talking for a short while after the tone has been played due both to the reaction time of the subscriber and to his/her "thinking time". In the example of FIG. 2, this delay is of the order of 0.8 seconds.

According to a first aspect there is provided a method of processing user speech data for transmission to a participant or participants in a push to talk session over a communications network, the method comprising:

removing an initial period of silence from the speech data prior to replaying of the speech data to the or each other participant.

The technology described herein is particularly applicable to removing an initial period of silence from the initial speech burst provided by the initiating party of the push to talk session. This has the effect of reducing the delay between the generation of the speech burst by the initiating subscriber and the playing of the speech burst to the or each other participant.

Preferably, said communication network is a cellular telephone network and the push to talk service is a Push to talk Over Cellular (PoC) service.

Embodiments of the invention may comprise a step of analyzing the speech data to identify an initial period of silence. This step may be carried out at the terminal of the initiating party, at a node within the communication network, or at a receiving terminal. Similarly, the step of removing the detected period of silence from the transmitted speech data may be carried out at the terminal of the initiating party, at a node within the communication network, or at a receiving terminal. The network node is preferably within the IP Multimedia Subsystem (IMS) in the case where the communication network is a cellular telephone network and the push to talk service is a PoC service.

In the case where the steps of detecting and removing are done at the initiating party's terminal, the step of detecting may comprise analyzing the speech data during or following recording of the data at the terminal.

Certain example embodiments may comprises monitoring the audio level and commencing recording of the speech only when that level exceeds some predefined threshold. This step may be carried out at the terminal of the imitating party or at a server node within the communication network. In other embodiments of the invention, an initial period expected to contain silence is predefined, and the start of the speech data is clipped to remove the predefined period. The predefined period may be fixed, or may be adaptive based upon talk/usage patterns of the user.

The step of removing an initial period of silence from the speech data may be carried out in real-time, as the speech data is received, or may be carried out by post-processing stored or buffered speech data.

According to a second aspect there is provided a server node for use in a communication network offering a push to talk service to subscribers, the node comprising:

a receiver for receiving a speech burst from a participant in a push to talk session; and a processor for detecting an initial period of silence in the speech data burst and removing the detected period of silence from the speech data prior to transmission to the or each other participant in the session.

Preferably, said server node is arranged to be located within an IP Multimedia Subsystem of a cellular telephone communications network, the node having an interface to one or more Session Initiation Protocol (SIP) servers including a Serving Call Session Control Function (S-CSCF) server.

According to a third aspect there is provided a mobile terminal for use in a communication network offering a push to talk service to subscribers, the terminal comprising:

a receiver for receiving speech data from a terminal user; and a processor for removing a period of silence from the speech data prior to transmission to the or each other terminal participating in the session.

Preferably, said mobile terminal is a wireless terminal and the communication network is a cellular telephone network offering a Push to talk Over Cellular service.

The mobile terminal may be a terminal used by said terminal user, or may be another terminal participating in the session.

DETAILED DESCRIPTION

Figure 1:
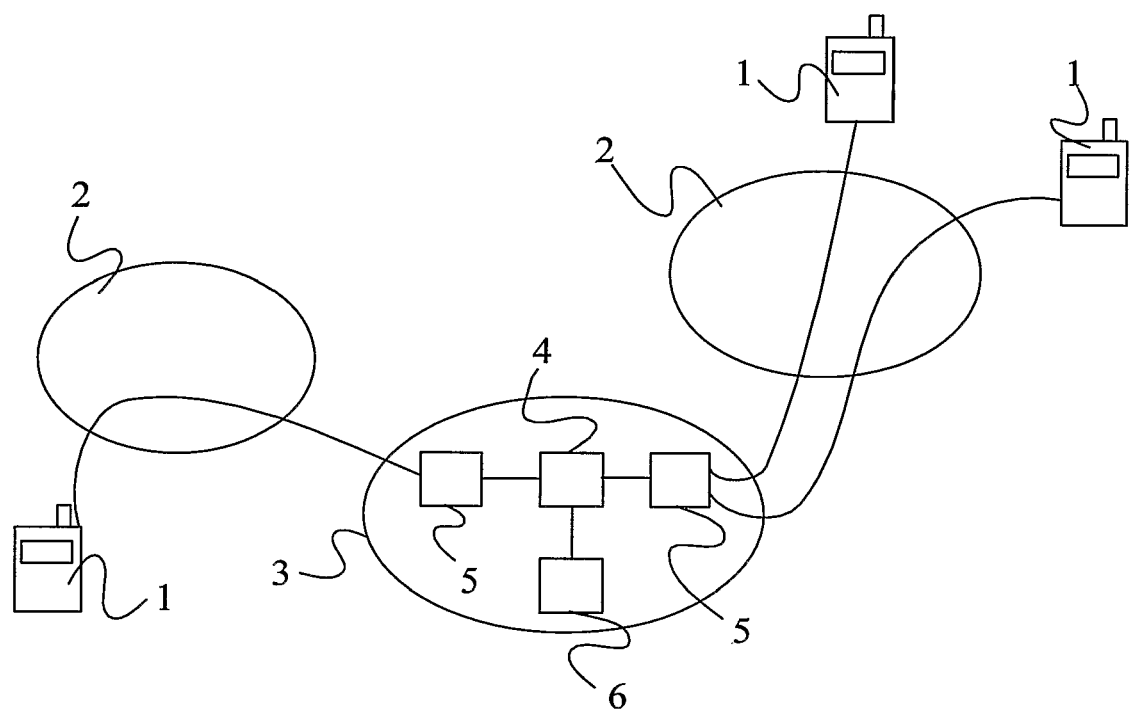
FIG. 1 illustrates schematically a cellular telephone communication network offering Push to talk Over Cellular services to subscribers.
Figure 2:
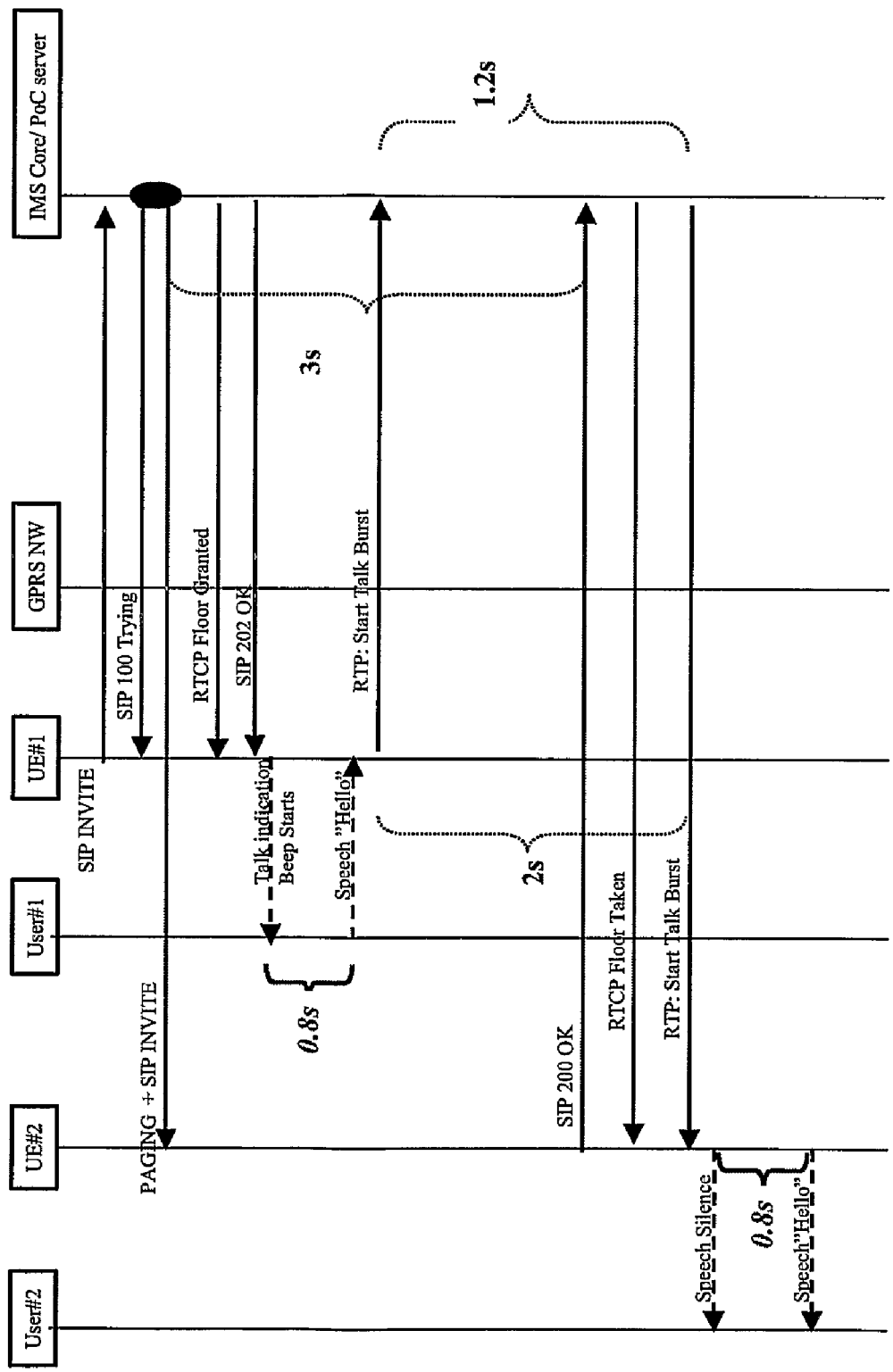
FIG. 2 is a signaling diagram illustrating signaling associated with the set-up phase of a Push to talk Over Cellular session and with an initial talk burst.

The delays inherent in establishing Push to talk Over Cellular (PoC) sessions have been described above with reference to FIGS. 1 and 2. A mechanism for significantly reducing these delays will now be illustrated with reference to a number of possible embodiments. These embodiments rely upon an appreciation of the fact that a participant in a PoC session will not start talking until a short time after his terminal has indicated that he can commence speaking by the sounding of a tone or other means.

In a first example embodiment, a Media Resource Function (MRF) of the PoC server begins receiving an the initial speech burst, sent from the initiating subscriber's mobile terminal (UE#1) following initiation of the PoC session. This burst will include an initial period of silence or background noise which might for example last for 0.8 seconds, and will be transported from UE#1 to the PoC server in a number of Real Time Protocol (RTP) frames. The PoC server buffers the received speech data and awaits receipt of a SIP 200 OK message from the other participant(s) in the session. This may take from a few milliseconds to several seconds. During this time, the PoC server analyses the buffered data to determine the length of the initial silent period, and clips the data to remove that period once identified. Following receipt of the 200 OK message(s), the PoC server begins transmitting the clipped speech from the front of the buffer.

Figure 3:
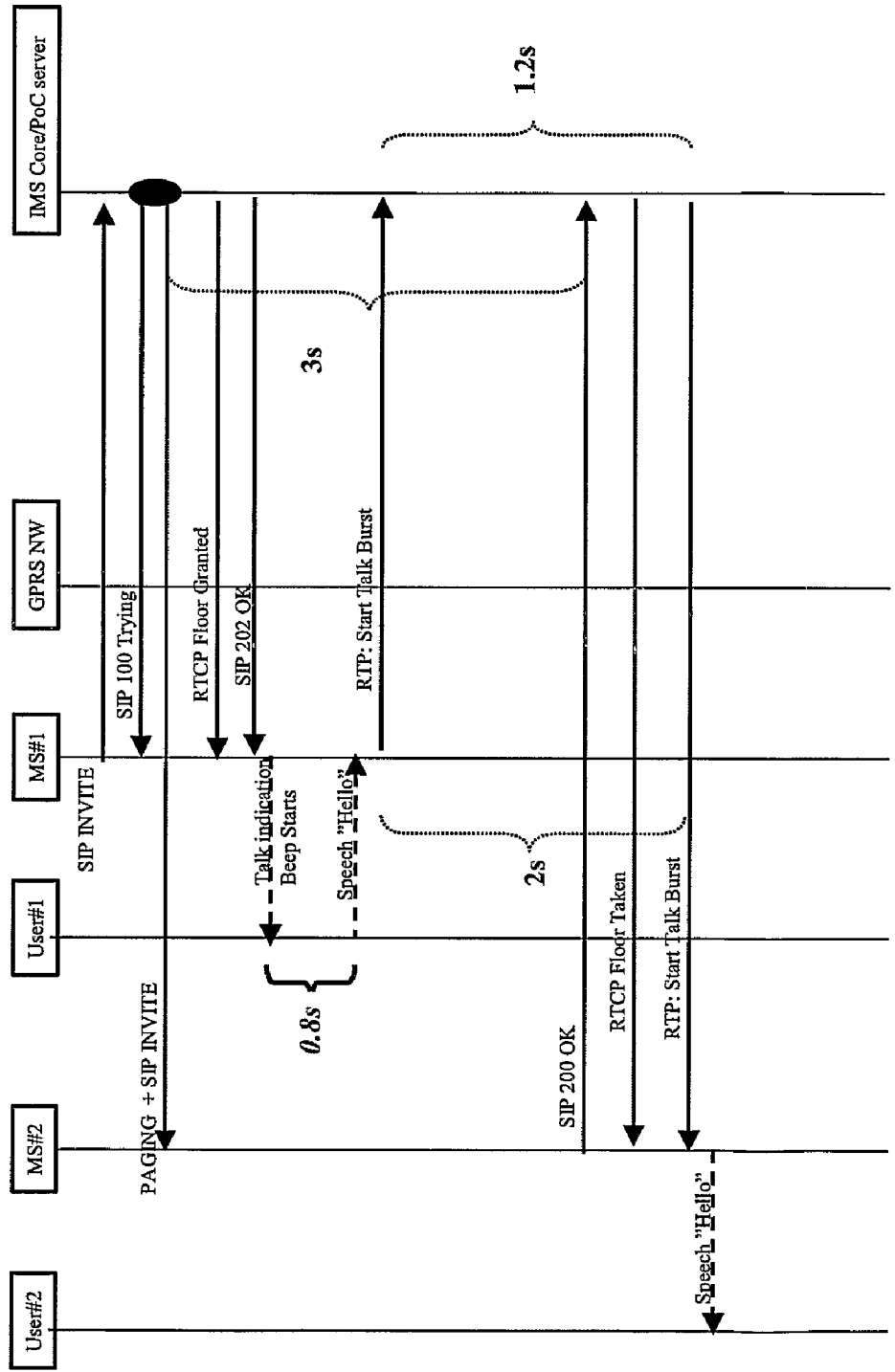
FIG. 3 is a signaling diagram illustrating signaling associated with an improved set-up phase of a Push to talk Over Cellular session and with an initial talk burst.

The signaling associated with this procedure is illustrated in FIG. 3. As has been explained above, the PoC server in the IMS core pages the called party (there are only two participants in the example illustrated) whilst simultaneously giving the "floor" to UE#1. By removing the initial silent period from the speech burst, speech is received by the UE#2 0.8 seconds in advance of what would otherwise be the case. It will be appreciated that the entire session is advanced by this same period, thus enhancing the real-time experience of the participants.

The process of determining the presence and duration of an initial silent period may be conducted at the PoC server by analyzing the volume of the received speech signal. When the volume exceeds some predefined threshold, it is assumed that the speech has started and the silent period ended. Of course, more sophisticated algorithms may be used. For example, the speech signal may be analyzed for the presence of patterns distinctive of speech, thereby preventing the presence of background noise from giving a false indication of speech. An alternative approach is to assume that speech cannot begin for some fixed period after the tone has sounded, e.g. 0.8 seconds, and to remove that period from the start of the speech burst. The length of this period may be adapted dynamically, depending upon the behaviour of the initiating party, or perhaps on the statistically analyzed behaviour of a group of subscribers.

The approach described above relies upon the speech analysis procedure and silent period removal being carried out within the IMS core. Providing sufficient processing capacity to achieve this is unlikely to be problematic. However, if sufficient processing capacity is available at the terminal of the initiating party, these steps may be carried out at that terminal. That is to say that, immediately following the sounding of the appropriate tone at that terminal, the terminal analyses the user's speech to determine the length of the initial silent period. In some cases, the tone may be sounded in advance of the "talk indication" message being received at the initiating party's terminal from the IMS core.

Analysis and modification of the initial speech burst may alternatively be carried out at the receiving terminal (or receiving terminals if there are more than two participants involved in the session). However, this requires that the data transfer speed over the interface between the receiving terminal and the IMS core is significantly faster that speech speed, with the received speech being "expanded" in time before playback. If this is the case, detecting and removing an initial silent period will still provide a significant reduction in the session latency, although not as great as that achieved with the other solutions described above.

The invention claimed is:

1. A method of processing user speech data at a processing entity for transmission to a participant or participants in a push to talk session over a communications network, the method comprising, following initiation of a push to talk session, but prior to receipt by the entity of a session acceptance from the or each participant:

analyzing the speech data to identify an initial period of silence; and removing the initial period of silence from the speech data prior to sending the speech data to a receiving terminal of the or each other participant.

2. A method according to claim 1, wherein said speech data is an initial speech burst provided by the initiating party of the push to talk session.

3. A method according to claim 1, wherein said communication network is a cellular telephone network and the push to talk service is a Push to talk Over Cellular service.

4. A method according to claim 1, wherein said step of analyzing the speech data to identify an initial period of silence is carried out at a terminal of the initiating party or a node within the communication network.

5. A method according to claim 1, wherein the step of removing an initial period of silence from the transmitted speech data is carried out at a terminal of the initiating party or a node within the communication network.

6. A method according to claim 5, wherein the network node is a Media Resource Function node.

7. A method according to claim 5, wherein the network node is located within an IP Multimedia Subsystem (IMS).

8. A method according to claim 1, further comprising monitoring the audio level to determine when speech has started.

9. A method according to claim 1, further comprising pre-defining an initial period expected to contain silence, and clipping the start of the speech data remove the predefined period.

10. A method according to claim 9, wherein the predefined period is fixed or is adapted in dependence upon subscriber behavior.

11. A server node for use in a communication network offering a push to talk service to subscribers, the node comprising:
 a receiver configured to receive a speech burst from a participant in a push to talk session; and
 a processor configured, following initiation of a push to talk session but prior to receipt by the network of a session acceptance from a receiving participant, to:
  detect an initial period of silence in the speech data burst; and
  remove the detected period of silence from the speech data prior to transmission to the or each other participant in the session.

12. A server node according to claim 11 and being arranged to be located within an IP Multimedia Subsystem of a cellular telephone communications network, the node having an interface to one or more Session Initiation Protocol (SIP) servers including a Serving Call Session Control Function (S-CSCF) server.

13. A server node according to claim 11, wherein the processor is configured to analyze the speech data to identify the initial period of silence following initiation of a push to talk session, but prior to receipt by the entity of a session acceptance from the or each participant and prior to removing the detected period of silence.

14. A mobile terminal for use in a communication network offering a push to talk service to subscribers, the terminal comprising:
 a receiver configured to receive speech data from a terminal user; and
 a processor configured, following initiation of a push to talk session, but prior to receipt by the mobile terminal of a session acceptance from a receiving terminal, to:
  remove a period of silence from the speech data prior to transmission to the or each other terminal participating in the session.

15. A terminal according to claim 14, the terminal being a wireless terminal and the communication network being a cellular telephone network offering a Push to talk Over Cellular service.

16. A terminal according to claim 14, wherein the receiver comprises means for converting speech into an analogue or digital electrical signal.

17. A terminal according to claim 14, wherein the receiver comprises means for receiving speech data over an interface link to said communication network, the speech data having been generated at a peer mobile terminal.

18. A terminal according to claim 14, wherein the processor is configured to analyze the speech data to identify the initial period of silence following initiation of a push to talk session, but prior to receipt by the mobile terminal of the session acceptance from the receiving terminal and prior to removing the period of silence from the speech data.

* * * * *